United States Patent [19]
Thompson

[11] 3,934,992
[45] Jan. 27, 1976

[54] TRUCK AIR FILTER

[75] Inventor: Terrence V. Thompson, Woodstock, Ill.

[73] Assignees: Terrence V. Thompson, Woodstock; George Athans, Cary; Leonidas Athans, Crystal Lake, all of Ill.

[22] Filed: June 19, 1974

[21] Appl. No.: 480,607

[52] U.S. Cl. .................. 55/324; 55/337; 55/385; 55/447; 55/480; 55/484; 180/54 B; 280/5 A
[51] Int. Cl.² .......................................... B01D 50/00
[58] Field of Search ............ 55/320, 321, 323, 324, 55/328, 329, 332, 337, 391, 422, 426, 462, 448, 447, 480, 483, 484, 503, 385; 280/5 A; 123/136; 180/54 B

[56] References Cited
UNITED STATES PATENTS

| | | | |
|---|---|---|---|
| 2,409,625 | 10/1946 | Haase | 55/447 X |
| 3,307,336 | 3/1967 | Dewsberry | 55/337 |
| 3,382,651 | 5/1968 | Hahl et al. | 55/337 |
| 3,429,108 | 2/1969 | Larson | 55/337 X |
| 3,442,067 | 5/1969 | Swenson | 55/337 X |
| 3,584,439 | 6/1971 | Gronholz | 55/337 X |
| 3,616,618 | 11/1971 | Gronholz et al. | 55/337 X |
| 3,641,744 | 2/1972 | Culbert et al. | 55/337 X |
| 3,672,130 | 6/1972 | Kaus et al. | 55/323 |
| 3,745,753 | 7/1973 | Risse | 55/337 X |

FOREIGN PATENTS OR APPLICATIONS

| | | | |
|---|---|---|---|
| 114,472 | 1/1942 | Australia | 55/480 |
| 884,872 | 10/1943 | France | 55/385 |
| 358,508 | 12/1936 | Italy | 55/484 |

*Primary Examiner*—Bernard Nozick
*Assistant Examiner*—David L. Lacey
*Attorney, Agent, or Firm*—Dawson, Tilton, Fallon & Lungmus

[57] ABSTRACT

An air filter for use on a truck or similar system includes a cylindrical side wall which is an integral part of or adapted to be mounted on a tank, such as the fuel tank of the truck as the principal means of support. The housing includes a front wall with a removable closure for permitting access to the interior to facilitate removal or replacement of the filter element without having to remove the inlet or outlet air conduits.

8 Claims, 4 Drawing Figures

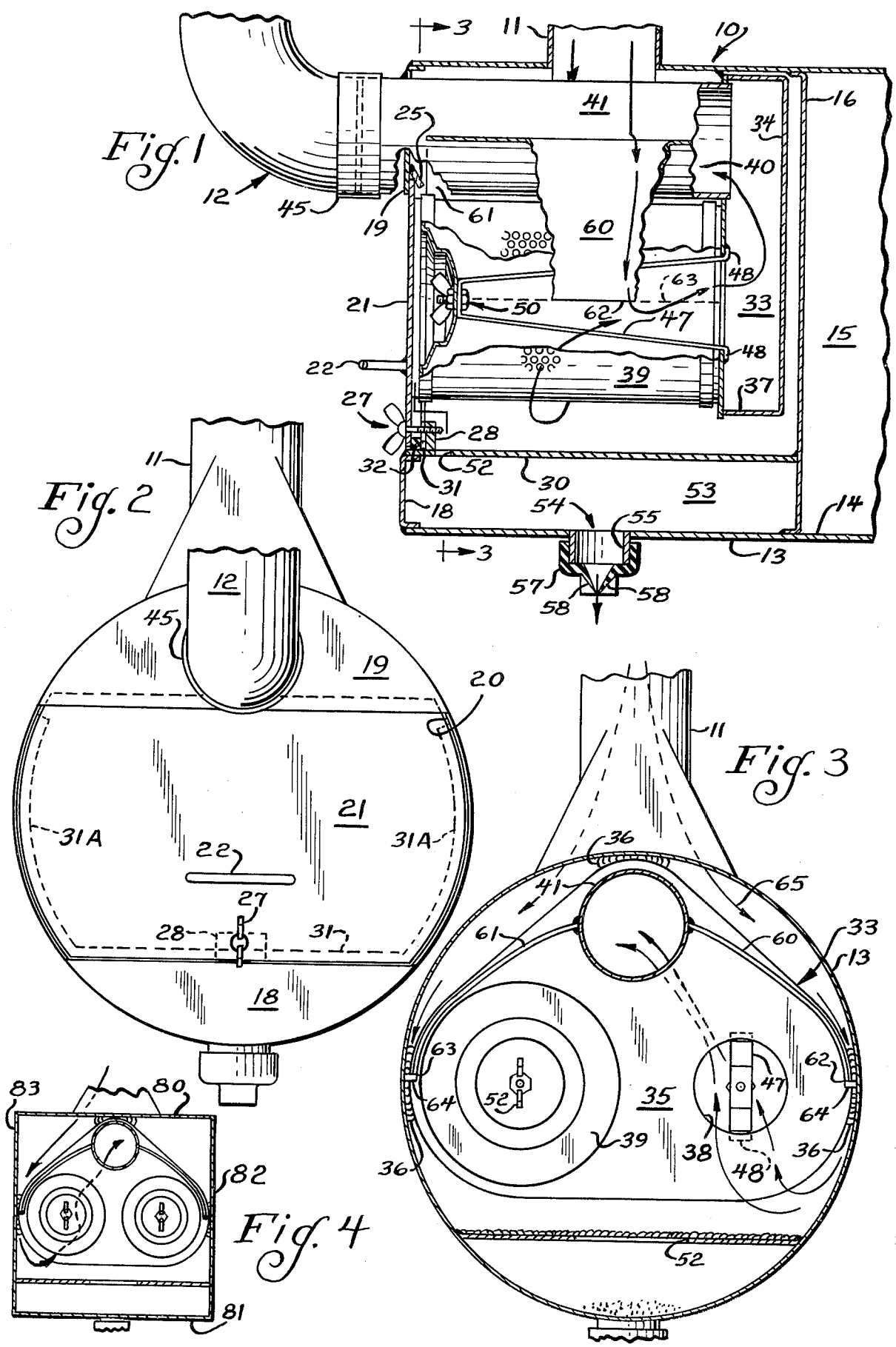

TRUCK AIR FILTER

BACKGROUND AND SUMMARY

The present invention relates to an air filter system for a vehicle. It is particularly useful on trucks.

In the past, air filters for trucks have been mounted on the fender of the truck. More recently, they have been mounted beneath or in back of the cab by means of a special bracket fastened to the truck frame. It will be appreciated that the tenancy for increasing the load of trucks has resulted in a corresponding increase in engine power and size, thus resulting in the need to filter large volumes of air prior to combustion in the engine. As a consequence, air filters have become increasingly large, weighing as much as 50–100 pounds, when considering the mounting brackets, metal body, filter elements, and so on.

It will further be appreciated that the filter system undergoes substantial vibration during hauling. If an air filter system weighing 80–100 pounds is mounted on a truck fender, it is not long before the fender will begin to tear under the severe vibration encountered. If, on the other hand, the air filter is mounted directly to the truck frame, special brackets are required to secure the rather heavy filter system to the frame, and these mounting brackets normally require that holes be drilled through the brackets and through the frame of the truck in alignment with each other so that bolts may be passed through the aligned holes to secure the brackets to the frame. Even though this latter method of mounting is acceptable from an operational viewpoint, the costs of installation are substantial, and the weight of the brackets is considerable. For example, even though the empty weight of a truck may be thousands of pounds, each additional pound added to the empty weight of the truck reduces the load it may haul.

Still another problem with existing commercial air filter systems is that of maintenance. In some cases, it is difficult to get at the filter housing to remove the element. In other cases, it may be necessary to remove either the inlet air conduit or the outlet air conduit, or both, in order to replace the filter element. It is desirable, of course, to keep operating efficiency at a maximum by maintaining the filter elements as clean as possible.

In brief, the present invention provides a truck air filter system including a side wall which is an extension of the fuel tank already secured to the truck frame. In general, of course, it is desirable that the shape of the side wall of the air filter conform to the shape of the tank with which it is integral. For example, if the tank is cylindrical, then the side wall of the air filter housing is cylindrical.

Air is taken in through the side wall, passed over baffles for distributing it axially of the housing, and passed through the filter elements. After passing through the filter elements, the air is collected in a plenum which communicates with the outlet air conduit for delivering air to the engine.

The outlet air conduit passes through the front wall of the filter housing, and this front wall also includes a removable closure or door which may be removed without having to remove either the inlet air conduit or the outlet air conduit, so as to facilitate access to the filter elements for maintenance purposes.

Preferably, the side wall of the filter element is aluminum to further reduce the weight of the air filter system, although considerable weight saving is realized even if steel is used.

In summary, the present invention provides an air filter system for a truck which avoids fender-mounting as well as special mounting brackets and their attendant installation costs and weight. Weight is still further reduced by making the side wall of the filter housing of aluminum. It has been found, for example, that as much as 50 pounds may thus be eliminated in a filter system for a large truck. Still further, the present invention facilitates maintenance by permitting access to the filter elements without having to remove either the inlet or the outlet air conduit. Also, being mounted on a tank which is normally spaced behind the cab, the air filter itself is located in a more convenient, more accessible place.

Other features and advantages of the present invention will be apparent to persons skilled in the art from the following detailed description accompanied by the attached drawing wherein identical reference numerals will refer to like parts in the various views.

THE DRAWING

FIG. 1 is a partilaly broken away side view of a filter system constructed according to the present invention with the major portion of the filter and housing being shown in vertical cross section;

FIG. 2 is a front end elevational view of the system of FIG. 1.

FIG. 3 is a transverse cross sectional view taken through the sight line 3—3 of FIG. 1; and FIG. 4 is a view similar to FIG. 3 of a modification wherein the housing has a rectangular cross section rather than a circular cross section.

DETAILED DESCRIPTION

Referring first to FIG. 1, reference numeral 10 generally designates an air filter system including an air inlet conduit 11 and an air outlet conduit 12. The filter system includes a cylindrical side wall 13 which is formed as an integral part of a similarly shaped side wall 14 of a tank, generally designated by reference numeral 15. The tank 15, as illustrated, may be a fuel tank; alternatives are an air start tank or hydraulic reservoir. A separating wall 16 separates the tank 15 from the air filter 10. Thus, the air filter 10 is cantilevered off the side wall 14 of the fuel tank 15 as its principal means of support. Of course, the means for supporting the fuel tank 15 may be adjusted or connected to the side wall 13 of the air filter 10, but no special or additional means are required.

Alternatively, in the case of a retro-fit, the side wall 13 of the air filter 10 may be provided with an enlarged skirt or band portion for fitting around the cylindrical side wall 14 of the tank 15 for welding thereto. Again, the principal means of support would be the means which hold the fuel tank 15 to the truck.

Referring now to FIGS. 1 and 2, the front wall of the filter system includes a lower portion 18 which is welded to the side wall 13 and a similarly welded upper portion 19, thereby leaving an enlarged central opening 20. A cover plate or closure 21 is provided for the opening 20. A handle 22 is welded to the cover plate 21.

The upper edge of the cover plate 21 is held in sealing engagement with the rear surface of the upper portion 19 of the end plate by means of a rear retention flange 25 which may be welded to the portion 19. The lower edge of the cover plate 21 is secured by means of a threaded fastener generally designated by reference numeral 27 which may be threaded into a block 28 welded to an intermediate bottom plate 30. A support flange 31 may be welded to the bottom plate 30, and it extends the full width of the lower edge of the cover plate 21, and up around the sides as at 31A, whereas the block 28 need not, as illustrated in dashed line in FIG. 2. A resilient sealing strip 32 may be provided between the flange 31 and the lower edge of the cover plate 21, if desired.

Turning now to FIGS. 1 and 3, a plenum generally designated 33 is located toward the rear of the air filter, and it includes a rear wall 34 and a front wall 35 which have the general shape of a triangle, as seen in FIG. 3, with rounded corners for providing surfaces which are welded to the interior of the cylindrical side wall 13 at locations designated by reference numberal 36 in FIG. 3. The rear wall 34 of the plenum 33 is solid, and the two walls 34, 35 are joined together by means of a continuous side wall 37 so as to provide an enclosed chamber.

The front wall 35 of the plenum is provided with two lower openings, one of which is designated 38 for receiving air filter elements 39, and an upper opening 40 which communicates the interior of the plenum 33 with the outlet air conduit 12 by means of an extension conduit 41. The extension conduit 41 passes through the upper front wall portion 19 and is welded thereto, and it is provided with a coupling 45 for connecting to the outlet air conduit 12.

A generally V-shaped bracket 47 is provided with feet 48 which are welded to the front wall 35 of the plenum 33 for supporting conventional air filter elements 39 which are secured to the bracket 47 by a threaded fastener 50.

The intermediate plate 30 located beneath the filter elements and the plenum 33 is welded at its right side in FIG. 1 to the rear wall 16; and it is provided with an aperture 52 which communicates with an air space 53 located above a discharge element generally designated 54. The discharge element 54 permits the discharge of any debris or water collected within the filter system, and it includes a sleeve 55 fitted with a flexible cap 57 which acts as a check valve—that is, it includes inwardly inclined walls 58 which come together at the distal or lower end. When the vehicle is not operating, the walls 58 permit the discharge water or solid debris; whereas a negative pressure (as caused when the engine is operating to suck air through the filter element) will cause the walls 58 to come together and thereby close the discharge element.

A pair of baffles 60, 61 extend from the respective sides of the extension conduit 41 (where they are welded) outwardly and about the filter elements 39 to positions at the outboard sides of these elements. The baffles 60, 61 extend from the plenum 33 forwardly to substantially cover the filter elements. The distal edges 62, 63 of the baffles 60, 61 are spaced inwardly from the side wall 13 to permit incoming air to pass; and the front and rear of each baffle edge 62, 63 is secured to the side wall 13 by members 64.

Thus, the baffles 60, 61 protect the filter elements from direct contact with rain or solid particles entrained in the incoming air.

In operation, when the engine is started, air is drawn in through the inlet conduit 11 and forced sideways by means of the baffles 60, 61, as indicated by the arrow 65 in FIG. 3. The baffles distribute the incoming air more evenly over the axial length of the horizontal filter elements; and because the upper portion of the filter elements is shrouded by the baffles, the air travels around the edges 62, 63 like a vortex. Thus, the centrifugal force and gravity assist in separating heavier-than-air particles or liquid from the incoming air prior to the air's entering the filter elements 39. The air is then drawn through the filter elements 39 and it enters the plenum 33 by means of the apertures 38. It is then drawn upwardly within the plenum 33 and through the extension conduit 41 into the discharge conduit 12 (see FIG. 1).

The filter elements 39 may be easily removed by loosening the front fastener 27, grasping the handle 22 and rotating the lower edge of the faceplate 21 outwardly to remove that faceplate. The fasteners 50 are then loosened and the filter elements may be individually removed. Persons skilled in the art will appreciate that the invention may be modified to accommodate filter elements other than those which have been illustrated, either in kind or number.

Turning now to FIG. 4, there is shown a modification of the present invention wherein the outer side wall of the filter system is square or rectangular in shape, thereby providing an upper wall 80, a lower wall 81, and first and second side walls 82, 83. The remainder of the system is similar to that which have already been illustrated and discussed.

The baffle structure described is considered to have important advantages in pre-filtering some of the heavier particles and rain prior to filtering by the elements 39. An alternative structure to accomplish this same result routes the incoming air behind the plenum 33—i.e., between the plenum and the rear wall 16 and thence into the lower space 53 where the intermediate horizontal wall 30 may be used to evenly distribute the air to the filter elements. In this embodiment, the heavier particles are collected directly in the space 53.

Having thus described in detail a preferred and a modified embodiment of the present invention, persons skilled in the art will be able to modify other aspects of the structure which has been illustrated and to substitute equivalents for those disclosed while continuing to practice the principle of the invention and it is, therefore, intended that all such modifications and substitutions be covered as they are embraced within the spirit and scope of the appended claims.

I claim:

1. In combination with an enclosed tank mounted on a motor vehicle and having horizontally extending wall means of closed cross section, an air filter system for delivering air to a discharge air conduit comprising a housing including a side wall connected to and supported by said tank, said side wall of said housing having the same cross section as said wall means of said tank and being a horizontal extension thereof; a vertical rear wall interposed between said filter system and said tank, and a front wall spaced laterally from said rear wall and including an access aperture; inlet air conduit means communicating through said housing for delivering air thereto; baffle means for intercepting air delivered from said inlet conduit for distributing the same within said housing; a plenum within said housing; air filter element means within said housing for filtering air from said baffle means prior to its entering into said plenum; a front panel removably mounted to cover said access aperture in said front wall to permit access to said filter element means; and extension conduit means for communicating the interior of said plenum with said discharge air conduit.

2. The apparatus of claim 1 wherein said filter element means comprise a pair of cylindrical filter elements located side-by-side with their axes extending horizontally and said baffle means comprises a pair of horizontally elongated baffles located beneath the opening of said inlet air conduit means and extending respectively about said filter elements for distributing said incoming air substantially along the length of said filter elements and on either side of said housing; said incoming air is forced between said housing and said baffles in two generally circular paths which come together beneath said elements whereby particles are forced to the outside of said housing and deposited beneath said elements as said paths come together.

3. The apparatus of claim 1 wherein said wall means of said tank and said side walls of said system each have a circular cross section and are continuous with each other.

4. The apparatus of claim 1 wherein said plenum is secured to said sidewall of said housing and comprises an enclosed chamber located adjacent said rear wall and including a forward wall including first aperture means for receiving air from said filter element means and second aperture means communicating the interior of said plenum with an extension conduit means.

5. In combination with a motor vehicle fuel tank with a horizontally elongated side wall of closed section, an air filter system comprising: a housing including a side wall extending laterally of and in cantilever relation with the side wall of said fuel tank, a vertical wall separating said filter system from said fuel tank, and a front wall, said housing including an access aperture, said side wall of said housing being an integral lateral extension of said side wall of said fuel tank; a cover panel removably secured to said housing adjacent said operative to close said access aperture; inlet air conduit means for delivering air into said filter system; outlet air conduit means for delivering air from within said filter system to the engine of said motor vehicle; a pair of filter elements removably mounted side-by-side within said housing and located adjacent said access aperture for convenience of replacement; and extension conduit means communicating air passing from said filter elements through said front wall of said housing and away from said fuel tank to said outlet air conduit means.

6. The apparatus of claim 5 wherein said inlet air conduit is connected to deliver air through said horizontally elongated side wall of said filter housing and wherein said communicating means comprises a plenum secured to said side wall and provided with mounting means for holding said filter element means, and an extension conduit communicating with the interior of said plenum through said front wall of said housing to said outlet air conduit means.

7. The apparatus of claim 5 wherein said inlet air conduit communicates with a space between said plenum and said rear wall for routing incoming air downwardly beneath said filter element means before said air enters said filter element means.

8. The apparatus of claim 5 wherein said inlet air conduit delivers air to said housing above said filter element means; said system further comprising baffle means interposed between said inlet air conduit and said filter element means to cover the same and to route incoming air down around the sides of said filter element means before said air enters said filter element means, whereby centrifugal force and gravity assist to eliminate heavier matter from said air before it enters said filter element means.

* * * * *